INVENTOR,
JESSE GUY MANLEY,
By Herbert A. Minturn,
ATTORNEY.

May 3, 1955 J. G. MANLEY 2,707,638
INDIVIDUALIZED GOLFER'S CHART
Filed Nov. 5, 1952 2 Sheets-Sheet 2

INVENTOR,
JESSE GUY MANLEY,
By Herbert A. McIntyre
ATTORNEY.

2,707,638

INDIVIDUALIZED GOLFER'S CHART

Jesse Guy Manley, Danville, Ill.

Application November 5, 1952, Serial No. 318,904

5 Claims. (Cl. 273—187)

This invention relates to a chart which is designed to meet the individual characteristics of a golfer in order that he may improve his game. There will be those days in which the golfer will find that he is playing an unusually good game as compared to his past performance, and then several days later when he attempts to repeat that excellent performance, he finds out that everything seems to be wrong. Then he looks up the "pro" and tries to find out what is wrong.

The "pro" is generally a pretty busy man, and while he may attempt to give lessons and instructions to those desiring them, nevertheless the same difficulty reoccurs from time to time since one's memory is not infallible, and instructions are easily forgotten. The present invention is intended to overcome these difficulties in that the individual golfer may have a chart prepared for his own use in accordance with his own individual characteristics so that he may not only achieve the desired uniformity of swing of the heads of the various clubs, but he may have a record in a permanent nature which he may employ for winter practice indoors as well as which he may employ for outdoor usage.

One of the highly important factors is that the club approach the ball in a correct line in order to secure the proper direction of flight of the ball.

The "pro" will study the individual golfer, and then prepare for him a chart substantially as shown in the accompanying drawings, in which.

Figure 1:
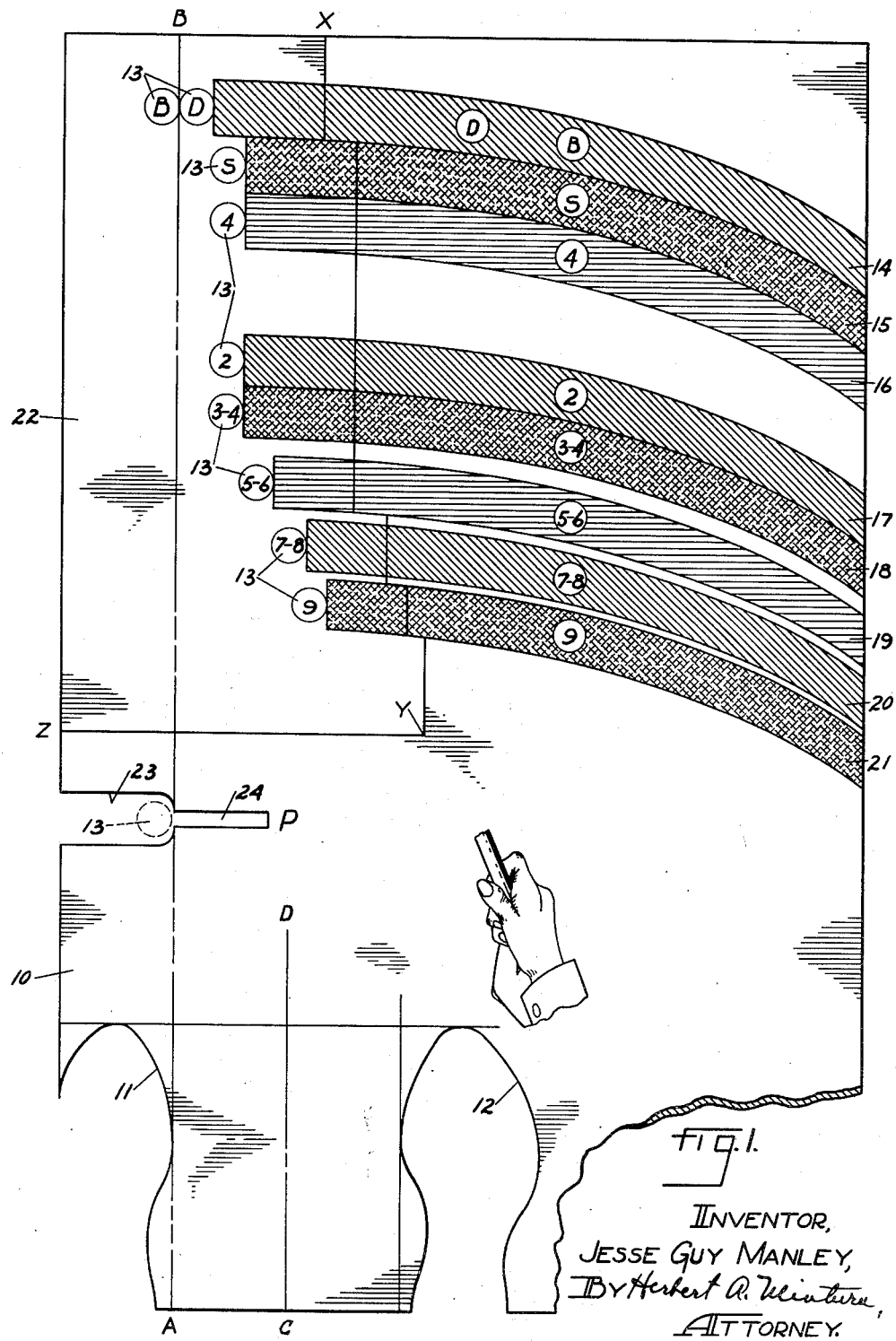
Fig. 1 is a view of the completed chart, primarily for indoor usage.
Figure 2:
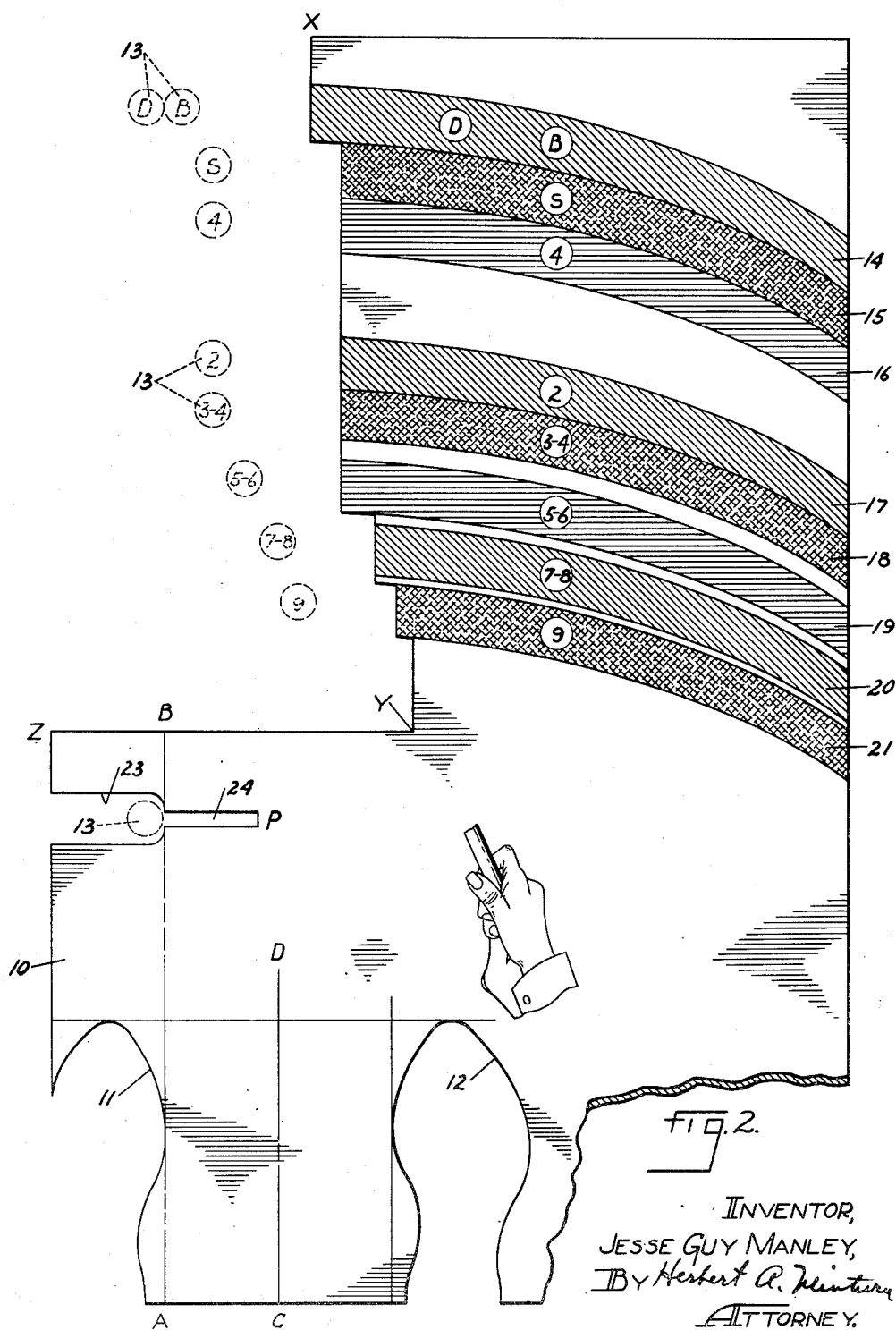
Fig. 2 is a top plan view of the chart with a section thereof removed such as would be the case in outdoor usage.

The individualities of the golfer will be studied, and then when the "pro" considers that the golfer has approached that state wherein a chart is ready to be prepared, a more or less rectangular piece of board, generally designated by the numeral 10, will be laid upon the floor or the ground. This board may be made out of any suitable material, such as plywood, fiber board, and the like, the essential characteristic being that the board will remain in a flat condition throughout a period of long usage. Also it is intended that the board be of such area that it will contain the desired data.

The player stands on one corner of the board 10, herein shown at the lower left hand corner, to have his feet apart for the normal stance, that is what is normal for him, and then a line is drawn around the shoe sole, and the board is cut out to give the outlines 11 and 12 for the left and right feet respectively.

A line AB is drawn across the board 10 tangent to the inside of the outline 11 and parallel to the center line CD between the cutouts 11 and 12.

The player will then take the driver or the brassie and swing the head through the line of approach which he would normally use in addressing the ball 13 positioned at line AB. When the "pro" is satisfied that this is the line wherein that particular individual will achieve his best result, he will place on the board 10 the arcuate area 14 preferably in some one color, herein indicated as being the color green. The particular color selected has no significance other than to identify that particular path of travel of the head of the particular club, that is the driver or the brassie, in its approach to the ball 13. Then the same procedure is employed to determine on the chart 10 the arcuate area within which the head of the spoon will travel and also the head of the four wood club. These particular areas are herein indicated to be in the colors of orange and blue respectively, designated by the numerals 15 and 16.

The same procedure is followed throughout the swinging of the other clubs, such as for the iron number two, following the area 17, again shown in green; clubs three and four again shown in the color orange and designated by the numeral 18; the clubs five and six swinging through the arcuate area 19 and designated to be in the color blue; the clubs seven and eight swinging through the area 20 indicated by the color green; and finally the number nine club swing path area 21 herein shown again in the color orange. The spacing apart of these various swing paths 14–21 is determined of course by the variations in lengths of the shafts of the clubs. Also it is to be noted that at the left-hand end of each of the swing paths, the ball 13 is set to the right somewhat of the line AB, generally coming between the line AB and what would be a continuation of the center line CD.

Now with these paths of swing approaching the ball to be driven, such paths being determined by the "pro" in observing the player as to his best lines of approach, will thus become a permanent record on the board 10 so that the player can return to this board time after time to determine what may be wrong with his game when the results are not uniform. With this chart, the player can practice over and over again swinging the clubs along those paths in his approach to the ball in order to perfect his control to maintain the club heads in those respective paths. Thus, the chart gives the player something tangible to take and use so that he does not have to depend entirely upon the mere verbal instructions of the "pro" and try to remember just what he did last time when he gets into trouble. Instead, he can use the chart to correct his errors.

In practicing out on the turf, the chart 10 is altered somewhat preferably by removing a section generally designated by the numeral 22 from the board 10. This section 22 is permanently severed from the board 10 on an irregular line XY stepped to the right in conformity to the ends of the various paths of swing. Then from the point Y, which is below the path of the number nine club, the section 22 is cut from the board 10 on a horizontal line or rather a line normal to the line AB from Y to Z.

As indicated in Fig. 1, the terminal left hand ends of the various swing paths 14–21 terminate in stepped relations to the right depending much upon the particular club used. This variation will range approximately from the line AB to the line CD. This spacing may vary somewhat depending upon the individual and his own height.

Returning again to the use of the chart when practice is being made in the open on the turf, this section 22 being removed cuts off the lines of swing, and therefore the ball 13 is dropped correspondingly at the end of each swing area which is selected a distance of approximately three to four inches to the length thereof so the ball will be then positioned almost in exact conformity to the placing of the ball at the ends of those lines of swing when the section 22 is still maintained as a part of the overall chart.

In all instances, it is to be understood that a player will swing the club head around about ninety degrees from the ball to his side substantially horizontally to intersect a line through his heel perpendicular to the line C—D when the club head would be lifted upwardly. Then the swing is reversed to bring the club down and around into the respective paths 14–21, depending upon the club used.

Then for practice in putting, the ball 13 may be positioned, Fig. 1, at the right hand end of a slot 23 which is cut in the board 10 back to the line AB, a narrow slot 24 continuous from the wider slot 23 in order to provide clearance for the putter. Not only does the slot 24 provide that clearance, but it also serves as a straight line path of swing or travel of the putter in its approach of the ball 13.

Thus, a chart may be prepared for each individual golfer, in accordance with the characteristics of his swinging of the club heads for his own best results, and further provides a chart which will permit the individual to achieve a uniform swinging of the clubs in order to maintain his best results. This chart provides a permanent record to which the individual player may return time and time again to correct his faults as they may develop and thus have a basis for self-correction without having to resort continuously to a "pro" or to trying to rack his own memory to determine what he has been doing wrong when his game is "off."

While the description has been made in reference to a right hand player, it is obvious that the chart may be reversed end for end for a left handed player, and therefore the directions of "left" and "right" as defined in the claims are to be interpreted accordingly.

Therefore, it is to be seen that I have provided a very simple means for aiding a golfer in improving and maintaining his form in the game of golf, and while structural variations may be employed without departing from the spirit of the invention, I do not desire to be limited to that precise form which has been described, beyond the limitations which may be imposed by the following claims.

I claim:

1. A chart of a golf club swing paths for an individual player which comprises a surface having locating means for each of the player's feet in his normal stance; club head swing path areas defined on the surface corresponding to the player's swing of the club heads in his characteristic swing of approach to the golf ball; said paths terminating by left hand ends defined on the chart at the desirable ball teeing position for each club; said positions being at and to the right of a line extending normally from the player tangent to the left foot inside line therealong; said swing path areas being lengths defined by the swing of the club heads from the right edge of said surface immediately approaching the ball to be driven to the ball teeing position in each instance, and further being spaced from an outermost path for the driver and brassie clubs, inwardly toward the player in consecutive paths for the spoon, the four wood, and the irons numbers 2, 3 and 4 in one path, 5 and 6 in the next path, 7 and 8 in the next path thereafter, and 9 in the innermost path; each of said paths carrying an identifying marking.

2. A chart of golf club swing paths for an individual player which comprises a surface having locating means for each of the player's feet in his normal stance; club head swing path areas defined on the surface corresponding to the player's swing of the club heads in his characteristic swing of approach to the golf ball; said paths terminating by left hand ends defined on the chart at the desirable ball teeing position for each club, said positions being at and to the right of a line extending normally from the player tangent to the left foot inside line therealong; said swing path areas being lengths defined by the swing of the club heads from the right edge of said surface immediately approaching the ball to be driven to the ball teeing position in each instance, and further being spaced from an outermost path for the driver and brassie clubs, inwardly toward the player in consecutive paths for the spoon, the four wood, and the irons numbers 2, 3 and 4 in one path, 5 and 6 in the next path, 7 and 8 in the next path thereafter, and 9 in the innermost path; each of said paths carrying an identifying marking; said chart having an outer left hand section divided from the remainder of the chart along a line across left hand end portions of said paths, said line being stepped to the right from the path ends distances to permit a ball to be placed to the left of the said section line upon removal of the section in approximately the same ball positions indicated on the section.

3. A chart of golf club swing paths for an individual player which comprises a surface having locating means for each of the player's feet in his normal stance; club head swing path areas defined on the surface corresponding to the player's swing of the club heads in his characteristic swing of approach to the golf ball; said paths terminating by left hand ends defined on the chart at the desirable ball teeing position for each club, said positions being at and to the right of a line extending normally from the player tangent to the left foot inside line therealong; said swing path areas being lengths defined by the swing of the club heads from the right edge of said surface immediately approaching the ball to be driven to the ball teeing position in each instance, and further being spaced from an outermost path for the driver and brassie clubs, inwardly toward the player in consecutive paths for the spoon, the four wood, and the irons numbers 2, 3 and 4 in one path, 5 and 6 in the next path, 7 and 8 in the next path thereafter, and 9 in the innermost path; each of said paths carrying an identifying marking; the left hand ends of the spoon, the four wood, and number 2–6 iron club paths terminating in a common line parallel to said line located to the right of the terminal left end of the driver and brassie swing path; the 7–8 iron club path left end terminating to the right of said common line; and the 9 iron club path terminating still further to the right of the left terminal end of said 7–8 club path end.

4. A chart of golf club swing paths for an individual player which comprises a surface having one position locating means for each of the player's feet in his normal stance; club head swing path areas defined on said surface corresponding to the player's swing of the club heads in his characteristic swing of approach to the golf ball and extending from the right hand edge of the surface, said paths terminating by left hand ends defined on the surface at the desirable ball teeing position for each club, said positions being at and to the right of a line extending normally from the player tangent to the left foot inside line therealong; a ball putting position indicated on said surface on the left hand side of said line; and a rectilinear path area leading from right to left perpendicular to and from the right hand side of said line to said last ball indication position.

5. A chart of golf club swing paths for an individual player which comprises a surface having locating means for each of the player's feet in his normal stance; club head swing path areas defined on the surface corresponding to the player's swing of the club heads in his characteristic swing of approach to the golf ball; said paths terminating by left hand ends defined on the chart at the desirable ball teeing position for each club, said positions being at and to the right of a line extending normally from the player tangent to the left foot inside line therealong; said swing path areas being lengths defined by the swing of the club heads from the right edge of said surface immediately approaching the ball to be driven to the ball teeing position in each instance, and further being spaced from an outermost path for the driver and brassie clubs, inwardly toward the player in consecutive paths for the spoon, the four wood, and the irons numbers 2, 3, and 4 in one path, 5 and 6 in the next path, 7 and 8 in the next path thereafter, and 9 in the innermost path; each of said paths carrying an identifying marking; the left hand ends of the spoon, the four wood, and number 2–6 iron club paths terminating in a common line parallel to said line located to the right of the terminal left end of the driver and brassie swing path; the 7–8 iron club path left end terminating to the right of said common line; and the 9 iron club path terminating still further to the right of the left terminal end of said 7–8 club path end; and a left hand outer and upper portion of said chart beyond said foot positions being separate from the remainder of the chart along lines drawn at substantially equal distances from said ball teeing positions.

References Cited in the file of this patent

UNITED STATES PATENTS 1,484,390     Gibbs et al. _____ Feb. 19, 1924